(12) United States Patent
Lim et al.

(10) Patent No.: US 8,154,521 B2
(45) Date of Patent: Apr. 10, 2012

(54) MOBILE TERMINAL

(75) Inventors: Seung-Geun Lim, Seoul (KR); Won-Seok Joo, Seoul (KR)

(73) Assignee: LG Electronics Inc., Seoul (KR)

( * ) Notice: Subject to any disclaimer, the term of this patent is extended or adjusted under 35 U.S.C. 154(b) by 1021 days.

(21) Appl. No.: 11/836,594

(22) Filed: Aug. 9, 2007

(65) Prior Publication Data
US 2008/0036627 A1 Feb. 14, 2008

(30) Foreign Application Priority Data
Aug. 10, 2006 (KR) .................. 10-2006-0075765

(51) Int. Cl.
| G09F 3/02 | (2006.01) |
| G09G 5/00 | (2006.01) |
| H03K 17/94 | (2006.01) |
| H03M 11/00 | (2006.01) |

(52) U.S. Cl. .......................... 345/170; 341/34
(58) Field of Classification Search .................. 341/22, 341/23, 31; 345/176, 168, 170; 178/18.11; 715/702–703; 342/22; 348/734; 200/5 R, 200/310; 725/80
See application file for complete search history.

(56) References Cited

U.S. PATENT DOCUMENTS

| 5,510,782 | A | * | 4/1996 | Norris et al. .................. 341/22 |
| 5,801,345 | A | * | 9/1998 | Mikula-Curtis et al. ...... 200/5 A |
| 5,818,361 | A | * | 10/1998 | Acevedo ...................... 341/23 |
| 5,936,554 | A | * | 8/1999 | Stanek ......................... 341/22 |
| 5,951,349 | A | * | 9/1999 | Larose et al. ................ 445/22 |
| 6,281,812 | B1 | * | 8/2001 | Kim ............................. 341/23 |
| 6,720,892 | B1 | * | 4/2004 | Lachor ......................... 341/22 |
| 7,154,428 | B2 | * | 12/2006 | de Clercq et al. ........... 341/175 |
| 7,283,066 | B2 | * | 10/2007 | Shipman ..................... 341/22 |
| 7,432,463 | B2 | * | 10/2008 | Clegg et al. ................. 200/310 |
| 2002/0021562 | A1 | | 2/2002 | Tholin et al. |
| 2002/0167421 | A1 | * | 11/2002 | Fo et al. ...................... 341/31 |
| 2005/0066370 | A1 | * | 3/2005 | Alvarado et al. ............ 725/80 |
| 2005/0083214 | A1 | * | 4/2005 | Chan et al. .................. 341/22 |

FOREIGN PATENT DOCUMENTS

| GB | 2 276 767 A | 10/1994 |
| GB | 2276767 | * 10/1994 |
| NL | 1021474 C1 | 3/2004 |

* cited by examiner

Primary Examiner — Timothy Edwards, Jr.
Assistant Examiner — Jerold Murphy
(74) Attorney, Agent, or Firm — Birch, Stewart, Kolasch & Birch, LLP

(57) ABSTRACT

A mobile terminal having a terminal body and a keypad located on the terminal body is provided. The keypad includes a plurality of keys configured to input information, a plurality of light emitting units, each light emitting unit being associated with a corresponding key of the plurality of keys to separately illuminate the corresponding key, a shielding member to reduce leakage of light from an activated light emitting unit to adjacent keys, and a control unit configured to detect when one of the plurality of keys is operated and to activate at least the light emitting unit associated with the operated key.

21 Claims, 5 Drawing Sheets

MOBILE TERMINAL

CROSS REFERENCE TO RELATED APPLICATIONS

This application claims priority to Korean Application No. 10-2006-0075765, filed Aug. 10, 2006, and is herein incorporated by reference in the entirety.

BACKGROUND OF THE INVENTION

1. Field of the Invention

The present invention relates generally to a mobile terminal and, more particularly, to a mobile terminal that individually illuminates one or more keys when the keys are operated.

2. Description of Related Art

In general, a mobile terminal is a portable mobile device that has one or more functions such as, voice and video call communication, inputting and outputting information, and storing data.

As the functions desired by consumers have become more diversified, mobile terminals have become more diversified to provide additional functions such as capturing an image or video, reproducing music or video files, playing games, or receiving broadcasts, to name a few. As a result, mobile terminals may be implemented in the form of a comprehensive (composite) multimedia player.

In order to keep pace with the consumer's demands, implementation of the multimedia player have take various approaches in terms of hardware and/or software. In addition to consumers' demands for diversified functions, consumers view mobile terminals as expressions of their personality. Consequently, various designs are increasingly required. In addition to personal preferences, consumers demand that the multimedia player provide a user interface environment to allow users to easily and conveniently search or select a function.

A keypad unit mounted on the mobile terminal can be actively utilized for the user interface environment, extending beyond its simple function of inputting keys. The keypad unit of the mobile terminal according to the related art includes multiple keys, and one or more light emitting diodes (LEDs) mounted at a lower portion of the keys to illuminate all the keys at one time. However, the one or more LEDs of the related art keypad unit merely implement backlighting, degrading its utilization.

BRIEF SUMMARY OF THE INVENTION

Therefore, in order to address the above matters the various features described herein have been conceived. One aspect of the exemplary embodiments, beyond the simple function of backlighting the keys, is to allow keys of a keypad to provide various information that can be recognized by a user by separately applying illumination to one or more of the keys. In so doing, it is desirable to effectively prevent a leakage of light of a light emitting unit that illuminates each key to an adjacent key.

According to principles of this invention and in accordance with a first aspect of the present invention, a mobile terminal having a terminal body and a keypad located on the terminal body is provided. The keypad includes a plurality of keys configured to input information, a plurality of light emitting units, each light emitting unit being associated with a corresponding key of the plurality of keys to separately illuminate the corresponding key, a shielding member to reduce leakage of light from an activated light emitting unit to adjacent keys, and a control unit configured to detect when one of the plurality of keys is operated and to activate at least the light emitting unit associated with the operated key.

In another aspect, the terminal includes a lighting unit, the lighting unit being configured to cause the light emitting unit associated with the operated key to blink.

In another aspect, the lighting unit may be configured to cause at least one additional light emitting unit to blink when the one of the plurality of keys is operated.

In still another aspect, the lighting unit may control the light emitting unit associated with the operated key by one of a spatial position, illumination time, light strength, color of each light emitting unit, and combinations thereof.

In yet another aspect, the lighting unit illuminates a corresponding light emitting unit or a light emitting unit selected from the remaining light emitting units according to a key input.

In a different aspect, the shielding member may be arranged to divide the plurality of keys. The shielding member may be an opaque wall.

In another aspect, the plurality of keys includes a plurality of key buttons, each of the key buttons having a transmissive region, and a touch sensing part disposed at a lower portion of the key buttons, the touch sensing part being configured to sense a touch applied to one of the plurality of key buttons. The touch sensing part may be configured to sense one of a change in capacitance and pressure.

In a further aspect, the touch sensing part may include a circuitry supporting substrate, and the plurality of light emitting units are positioned at a lower portion of the circuitry supporting substrate.

In still another aspect, a diffusion member for diffusing light of the light emitting unit may be provided between each of the key buttons and the circuitry supporting substrate.

In another aspect, the circuitry supporting substrate may include a through hole corresponding to each of the plurality of light emitting units, each through hole receiving at least a portion of the corresponding light emitting unit therein.

In yet another aspect, each light emitting unit is an LED.

In another aspect, each of the plurality of keys may be operated in a touch manner to input information. The plurality of keys include a plurality of key buttons, a pad positioned at lower portions of key buttons, and a touch sensing part disposed at lower portions of the key buttons, the touch sensing part being configured to sense a touch applied to one of the plurality of key buttons. The pad may be integrally formed to fix the key buttons. The shielding member may include a first shielding member positioned at an upper portion of the pad to prevent light leakage between key buttons, and a second shielding member positioned between the pad and the touch sensing unit to prevent light leakage between the light emitting units.

In still another aspect, each of the plurality of keys may be operated in a push manner to input information. Each key includes a key button having an edge, an elastic film formed on the edge of the key button, and a switch positioned at a lower portion of the key button, the switch being operated by the key button. The shielding member may be located at the elastic film.

In a further aspect, the terminal includes a circuitry supporting substrate, each of the switches being located on the circuitry supporting substrate. Each switch includes a plurality of electrical contacts formed in a concentric circle on the circuitry supporting substrate, and a conductive membrane formed on a lower surface of the elastic film, the conductive membrane being configured to contact the electrical contacts when the key button is pressed.

According to principles of the present invention, a mobile terminal having a terminal body and a keypad located on the terminal body, is provided. The keypad includes a plurality of keys configured to input information, a plurality of light emitting units, each light emitting unit being associated with a corresponding key of the plurality of keys to separately illuminate the corresponding key, a shielding member to reduce leakage of light from an activated light emitting unit to adjacent keys, and a control unit configured to activate less than all of the plurality of light emitting units when an input is detected by the control unit.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

A mobile terminal according to exemplary embodiments of the present invention will now be described with reference to the accompanying drawings. At the outset it is noted that the mobile terminal is shown as a sliding type mobile terminal, but application of the present invention is not so limited. Rather the present invention could be applied to many other forms of mobile terminals including, but not limited thereto, bar type mobile terminals, folding type mobile terminals, swing type mobile terminals, and combinations thereof.

Figure 1:
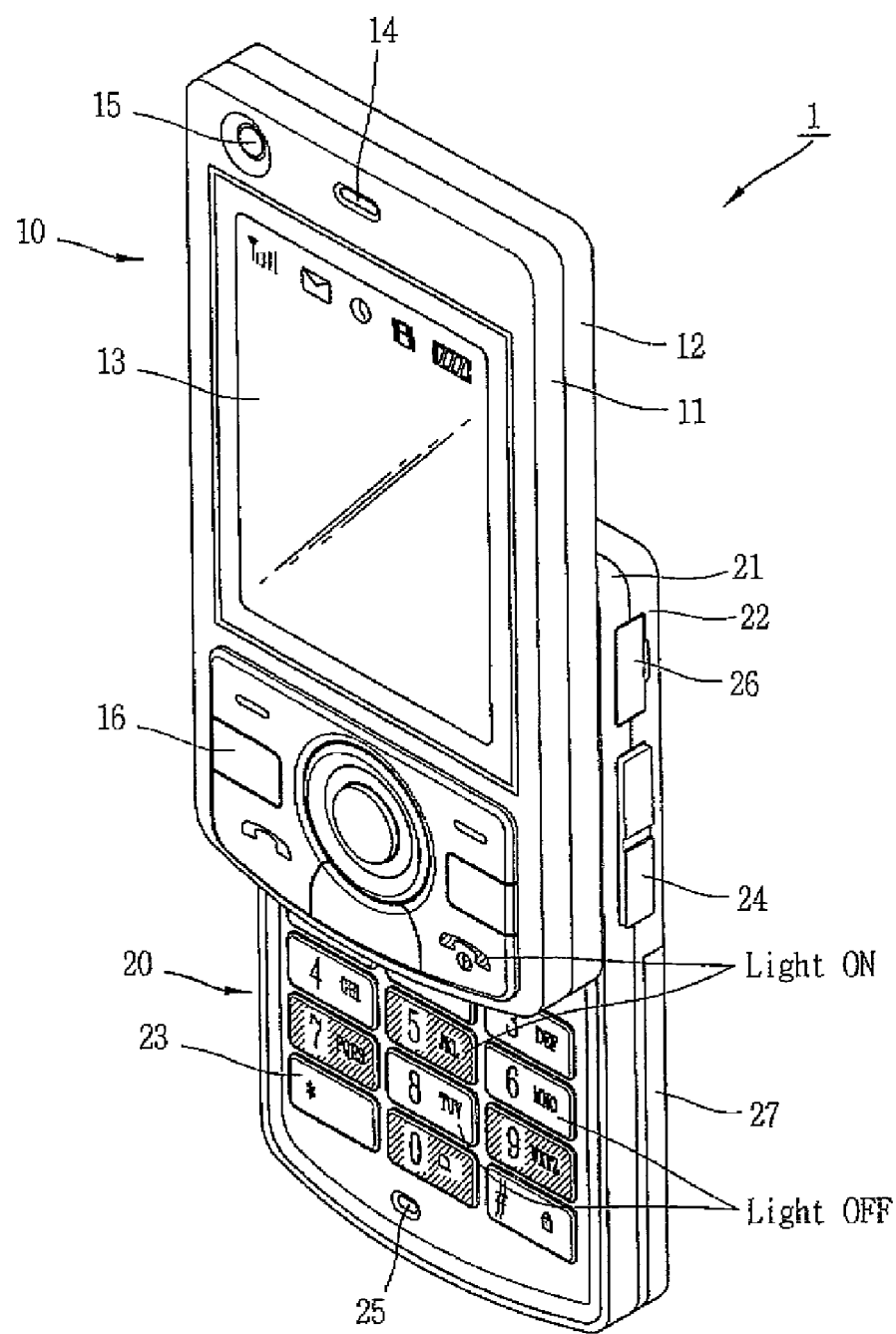
FIG. 1 is a front perspective view of a mobile terminal according to an exemplary embodiment of the present invention.

As seen in FIG. 1, a mobile terminal 1 according to an exemplary embodiment of the present invention includes a first body 10 and a second body 20 formed to be slidably moved along at least one direction with respect to the first body 10. A state in which the first body 10 is disposed to overlap with the second body 20 may be called a closed state (closed configuration), and a state in which the first body 10 is disposed to expose at least a portion of the second body 20 may be called an opened state (opened configuration).

In this exemplary embodiment, the mobile terminal 1 is mainly operated in a standby mode in the closed state, but the standby mode can be released by a user manipulation. The mobile terminal 1 is mainly operated in a call mode in the opened state, but it can be changed to the standby mode according to a user manipulation or with the lapse of time.

A case (i.e., a casing, a housing, or a cover, etc.) forming the external appearance of the first body 10 includes a front case 11 and a rear case 12. Various electronic components are installed in a space formed by the front case 1 and the rear case 12. At least one intermediate case can be additionally disposed between the front case 11 and the rear case 12. The cases can be formed by injection-molding a synthetic resin or can be made of a metallic material such as stainless steel (STS) or titanium (Ti), etc.

As seen in FIG. 1, a display unit 13, a sound output unit 14, a first image input unit 15, and/or a first manipulation unit 16 may be located on the first body 10. While the display unit 13, sound output unit 14, first image input unit 15, and first manipulation unit 16 are shown on the front case 11, one or more could be located on the rear cover 12.

The display unit 13 includes a Liquid Crystal Display (LCD) module or an Organic Light Emitting Diode (OLED) module that visually displays information. The display unit 13 may further include a touch screen that allows inputting of information by user's touching the touch screen.

The sound output unit 14 can be implemented in the form of a receiver or a speaker.

The first image input unit 15 can be implemented in the form of a camera module that captures an image or video of the user.

The first manipulation unit 16 receives an input for individual illumination.

Like the first body 10, a front case 21 and a rear case 22 may constitute a case of the second body 20. On the second body 20, preferably, on a front surface of the front case 21, a second manipulation unit 23 may be disposed. A third manipulation unit 24, a first sound input unit 25, and an interface 26 may be disposed on at least one of the front case 21 and the rear case 22.

The first to third manipulation units 16, 23, and 24 may be generally called a manipulation part, and may be implemented in any type of method so long as a user can manipulate it in a tactile manner Various shapes of the manipulation units according to the present invention are as shown in FIGS. 4 to 7. In these configurations, each of the manipulation units may be in the form of keypads which include one or more key buttons.

The first to third manipulation units 16, 23 and 24 may input a desired number, a desired character, or issue a command for implementing a particular function through each key, and each input situation can be shown on the display 13.

Each key of the first to third manipulation units 16, 23, and 24 can be illuminated individually. In addition, whether a specific key is to be illuminated, the illumination time, the illumination strength, and the color of each key may be the same or different. Accordingly, each key may transfer a visual light signal to the user through the individual illumination. For example, FIG. 1 discriminately shows turned-on keys and turned-off keys.

In terms of function, the first manipulation unit 16 may be operated to input a command such as start, end, and scrolling, etc. The second manipulation unit 23 may be operated to input numbers, characters, or symbols. The third manipulation unit 24 may be operated as a hot key for performing a particular function such as activating of the first image input unit 15.

The first sound input unit 25 may be implemented in the form of, for example, a microphone in order to receive a voice of the user or other sounds.

The interface 26 serves as a path for allowing the mobile terminal 1 to exchange data with an external device. For example, the interface 26 can be a connection terminal to be connected with an earphone through a fixed line or wirelessly, a port (e.g., IrDA port) for local area communication, BLUE-TOOTH port, a wireless LAN port, or a power supply terminal that supplies power to the mobile terminal 1. The interface 26 can be a Subscriber Identification Module (SIM), a User Identification Module (UIM), or a card socket that accommodates an external card such as a memory card that stores information.

A power supply unit 27 is mounted at the rear case 22 in order to supply power to the mobile terminal 1. The power supply unit 27 can be, for example, a chargeable battery that is detachably combined with the mobile terminal 1.

Figure 2:
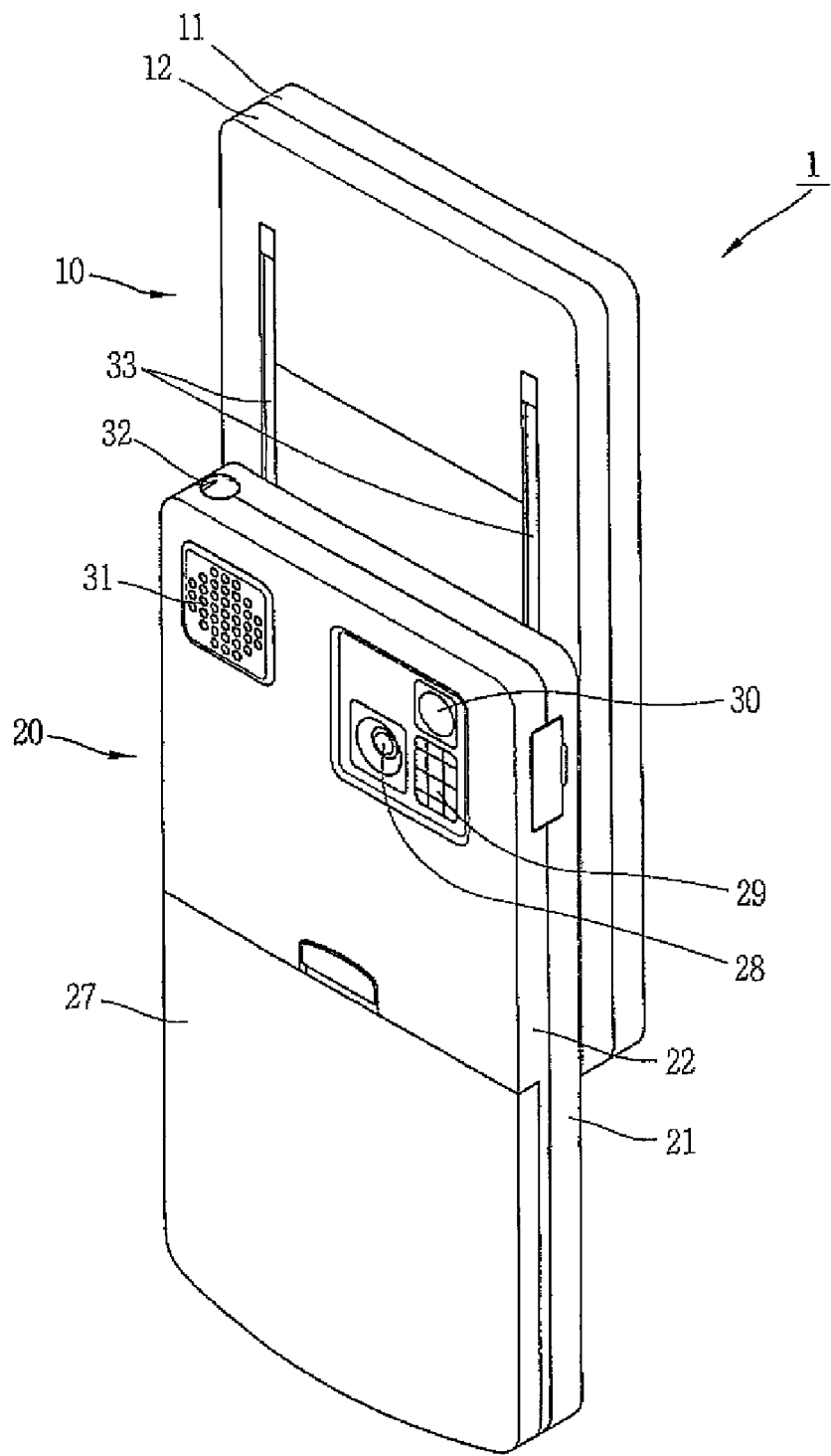
FIG. 2 is a rear perspective view of the mobile terminal in FIG. 1.

As seen in FIG. 2, a second input unit 28 may be located on the rear surface of the rear case 22 of the second body 20. The second image input unit 28 has an image capturing direction that is substantially opposite the first image input unit 15 (FIG. 1), and may be a camera having different pixels from those of the first image input unit 15. For example, the first image input unit 15 may have low pixels so that it can capture an image of the user's face and transmit it to another party during video call communication, while the second image input unit 28 may have high pixels because, in most cases, it is not used to immediately transmit a captured image of a general subject after the image of the subject is captured.

A flash 29 and a mirror part 30 may be additionally disposed near the second image input unit 28. The flash 29 emits light toward the subject when the image of the subject is captured through the second image input unit 28. The mirror part 30 allows the user to minor his/her face therein when the user captures his/her image (self-photographing) by using the second image input unit 28.

A second sound output unit 31 can be additionally located on the lower cover 22. The second sound output unit 31 may implement a stereo function together with the first sound output unit 14 (FIG. 1), and may be used for call communication in a speakerphone mode.

In addition to an antenna for a call, etc., a broadcast signal receiving antenna 32 may be separately disposed at one side of the lower cover 22. The antenna 32 may be installed such that it can be extendable (withdrawn) from the second body 20.

One portion of a slide module 33 that slidably combines the first and second bodies 10 and 20 is positioned on the rear case 12 of the first body 10. Another portion of the slide module 33 (not shown) is disposed on the front case 21 of the second body 20.

While the second input unit 28 of the exemplary embodiment has been described as being disposed at the second body 20, the present invention is not so limited. For example, one or more of the elements 28 can be mounted on the first body 10. For example, the second image input unit 28 may be located on the rear cover 12 of the first body 10. In this case, in a closed state, the second body 20 can advantageously protect the elements disposed on the rear cover 12. In addition, even if the second image input unit 28 is not provided, the first image input unit 15 may be formed to be rotatable such that images that would be captured by the second image input unit 28 may be taken.

Figure 3:
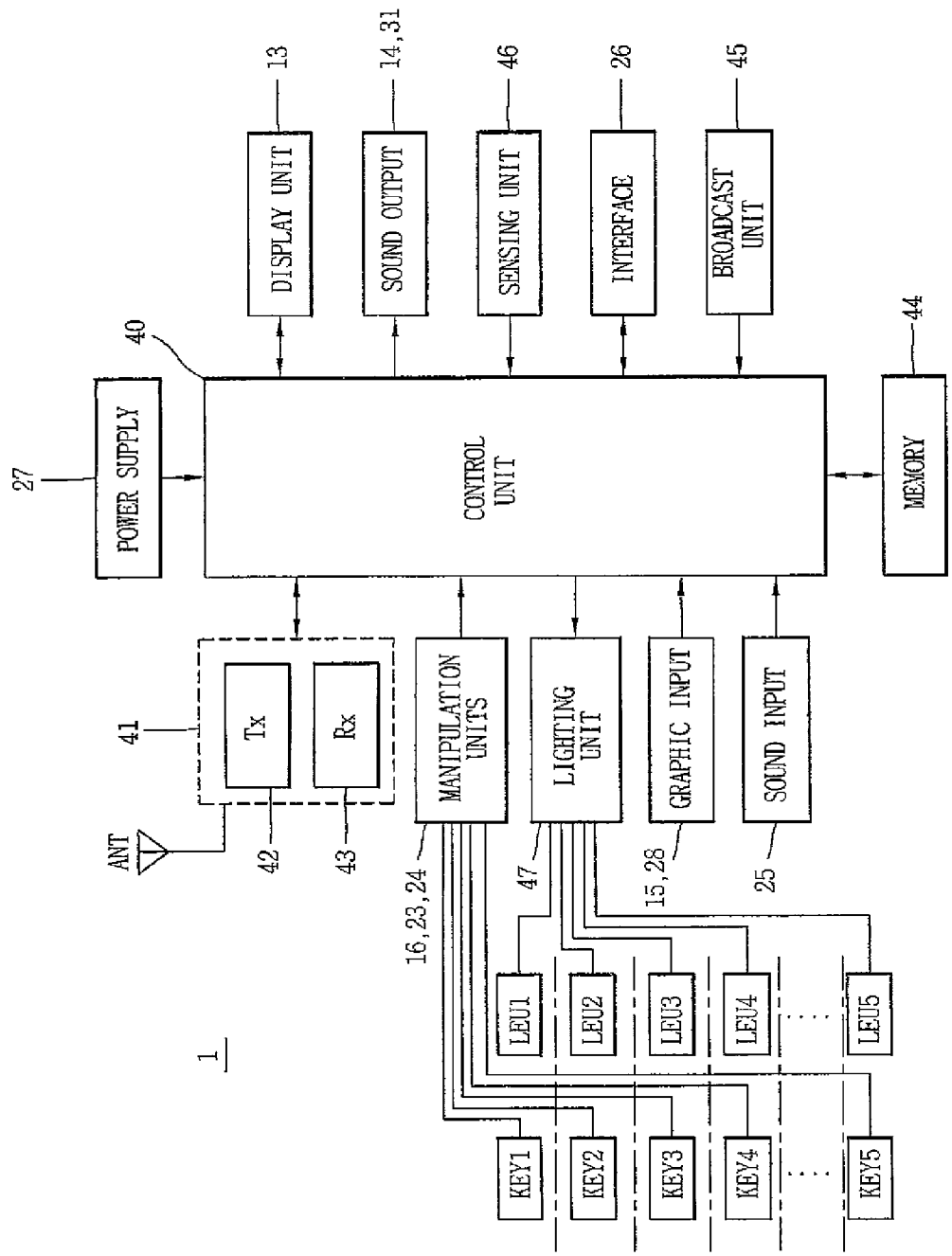
FIG. 3 is a schematic block diagram according to the exemplary embodiment of the present invention.

As shown in FIG. 3, the mobile terminal 1 includes a wireless communication module 41, manipulation units 16, 23 and 24, the sound input unit 25, the display unit 13, the sound output units 14 and 31, a sensing unit 46, the interface 26, a broadcast receiving unit 45, a memory 44, the power supply unit 27, a control unit 40, and a lighting unit 47.

When any key of the manipulation units 16, 23, and 24 is operated, the lighting unit 47 can transmit and receive a control signal from the control unit 40 to activate the light emitting unit corresponding to the operated key or one selected from the remaining light emitting units to emit light to thus provide a light signal to the user.

In addition, the light unit 47 may receive a signal from the wireless communication module 41, the image input units 15 and 28, the sound input unit 25, the sensing unit 46, the interface 26, or the broadcast receiving unit 45, etc., as well as from the manipulation units 16, 23 and 24, and activate a selected light emitting unit in response thereto. If desirable, one or more of the light emitting units, but not all, may be activated. It is also understood that at times, it may be desirable to activate all light emitting units at the same time.

As described above, the control unit 40 controls an operation of the light unit 47. In addition, the control unit 40 controls general operation of the mobile terminal 1. For example, the control unit 40 performs a related controlling and processing for voice call communication, data communication or video call communication, etc.

The wireless communication module 41 transmits and receives a radio signal to and from a mobile communication base station through an antenna. For example, the wireless communication module 41 handles transmitting and receiving voice data, text data, image data and control data under the control of the control unit 40. The wireless communication module 41 includes a transmitting unit 42 that modulates a signal to be transmitted and transmits it and a receiver 43 that demodulates a received signal. When a voice, a character, or an image is transmitted or received by the wireless communication module 41, the corresponding situation can be converted into a control signal for activating the light emitting units by the lighting unit 47 and then outputted.

The manipulation unit 16, 23 and 24 are provided as shown in FIG. 1 and each provides key input data inputted by the user to control the operation of the mobile terminal 1 to the control unit 40. The operation of the manipulation units 16, 23, and 24 can be a source based on which the lighting unit 47 operates. For example, when one of the keys of the manipulation units 16, 23 and 24 is operated, it may guide a next level of a menu activated by a signal corresponding to the key and the lighting unit may activate the light emitting unit associated with the key.

The image input units 15 and 28 process an image frame such as a still image or video frame obtained by an image sensor when operated in an image capture or video call mode. The processed image/video frame is converted into image data that can be displayed on the display unit 13 and then outputted to the display unit 13. The image/video frame processed by the image input unit 15 and 28 can be stored in the memory 44 or transmitted to the exterior through the wireless transmitting/receiving unit 41 under the control of the control unit 40. When the image input units 15 and 28 are in an operation mode, a key set for controlling the image input units 15 and 28 can be re-adjusted by the lighting unit 47. Namely, keys that may be selected at a certain stage are illuminated for user's easy recognition.

The sound input unit 25 receives an external sound signal by a microphone in a call mode, a record mode, or a voice recognition mode, etc., and converts it into electrical sound data. In the call mode, the processed voice data is converted into a form that can be transmissible to a mobile communication base station through the wireless communication module 41 and then outputted to the wireless communication module. In the record mode, the processed voice data is outputted to be stored in the memory 44. The sound input unit 25 may implement various noise canceling algorithms in order to cancel noise generated in the process of receiving an external sound signal. A signal received by the sound input unit 25 can be visualized through an equalizer that can visually output it by the lighting unit 47.

The display unit 13 displays and outputs information processed in the mobile terminal 1. For example, when the mobile terminal is in the call mode, the display unit 13 displays and outputs a UI (User Interface) or a GUI (Graphic User Interface) related to a call under the control of the control unit 40. When the mobile terminal is in the video call mode or in the image capture mode, the display unit 13 displays and outputs a captured image or the UI and GUI under the control of the control unit 40. When the display unit 13 includes a touch screen, it can be also used as an input unit as well as the output unit.

The sound output units 14 and 31 convert sound data received from the wireless communication module 41 and sound data stored in the memory 44 in a call signal reception mode, a call mode, a record mode a voice recognition mode, or a broadcast reception mode, etc. and outputs it to the exterior under the control of the control unit 40. In addition, the sound output units 14 and 31 output a sound signal related to a function (e.g., a call signal reception sound, a message reception sound, etc.) performed in the mobile terminal 1. The sound output units 14 and 31 may include a speaker, a receiver, and a buzzer, etc. A signal outputted through the sound output units 14 and 31 can be visualized through the equalizer that can visually output it by the lighting unit 47.

The sensing unit 46 senses a current state of the mobile terminal 1 such as an opened/closed state of the mobile terminal, a location of the mobile terminal, and whether or not the user is in contact with the mobile terminal, and generates a sense signal for controlling the operation of the mobile terminal 1. For example, when the mobile terminal 1 is a slide phone, the sensing unit 46 senses whether the slide phone is opened or closed and outputs the sensing results to the control unit 40 to thus control the operation of the mobile terminal 1. In addition, the sensing unit 46 handles a sensing function related to whether or not the power supply unit 27 supplies power or whether or not the interface 26 is combined with an external device. A signal sensed by the sensing unit 46 is applied to the control unit 40, and the control unit 40 blinks one or more light emitting unit selected from the light emitting units through the lighting unit 47 to form an illumination signal.

The interface 26 serves the purpose of providing an interface with various external devices connected with the mobile terminal 1, such as, a wired/wireless headset, an external charger, a wired/wireless data port, a card socket (e.g., a memory or a SIM/UIM card, etc) and the like. The interface 26 may receive data or power from the external device and transmit it to each element within the mobile terminal 1 or transmit internal data of the mobile terminal to the external device. When a signal is transmitted or received to or from the external device through the interface 26, the lighting unit 47 blinks one or more light emitting units selected from the light emitting units to this form an illumination signal.

A program for controlling an operation of the lighting unit 47 related to the present invention can be stored in the memory 44. In addition, a program for processing and controlling the control unit 40 can be stored in the memory 44 or the memory 44 may perform a function for temporarily storing inputted or outputted data (e.g., a phone book, a message, a still image or video, etc.). The memory 44 may take many forms including one or more of a hard disk, a card type memory (e.g., an SD or an XD memory, etc.), a flash memory, a RAM, and a ROM, etc.

The broadcast receiving module 45 receives a broadcast signal transmitted through a satellite or a ground wave, converts it into a broadcast data format that can be outputted to the sound output units 14 and 31 and the display unit 13, and outputs it to the control unit 40. The broadcast receiving module 45 receives supplementary data (e.g., Electric Program Guide (EPG), a channel list, etc.) related to broadcasting. Broadcast data and supplementary data converted in the broadcast receiving module 45 can be stored in the memory 44. Among signals received by the broadcast receiving module 45, an audio signal can be visualized through an equalizer that can visually output it by the lighting unit 47.

The power supply unit 27 receives external power or internal power under the control of the control unit 40 and supplies power required for operations of each element.

Having described the overall features of an exemplary mobile terminal, the manipulation parts 16, 23, and 24 will be described with reference to FIGS. 4-6. As previously described, these manipulation parts may take the form of keypads having a plurality of keys.

Figure 4:
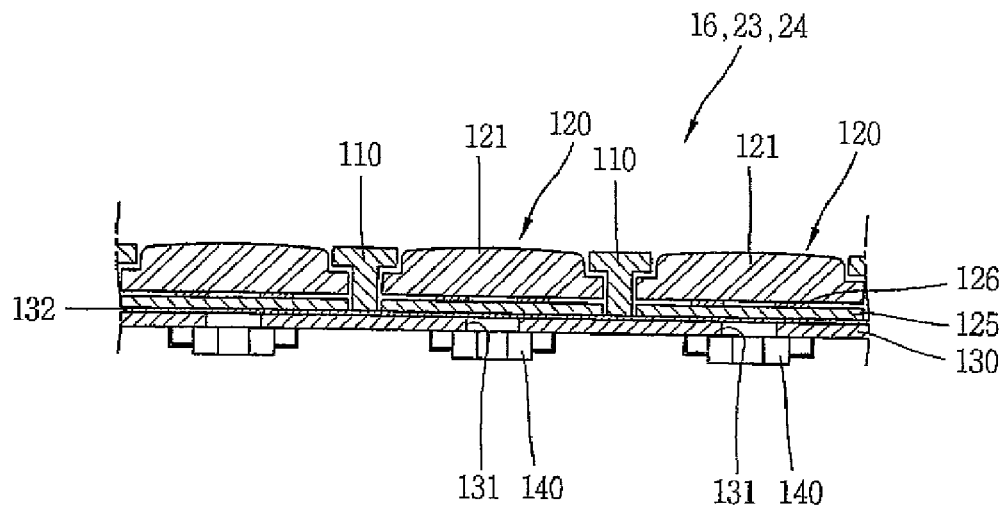
FIG. 4 is a sectional view showing one example of a manipulation part according to the exemplary embodiment of the present invention.

As shown in FIG. 4, respective keys 120 forming the manipulation units 16, 23 and 24, include key buttons 121 that can be contacted by the user's finger. The key buttons 121 are supported by a lower circuitry supporting substrate 130.

A touch sensing part 132 that senses touch of the key buttons 121 is provided between the circuitry supporting substrate 130 and the key buttons 121. Thus, when a user's finger approaches or contacts one of the key buttons 121, the touch sensing part 132 senses a change in capacitance of the key button 121 and transfers an input signal to the circuitry supporting substrate 130.

The circuitry supporting substrate 130 includes through holes 131, each through hole corresponding to a key button 121. A light emitting unit 140 is mounted on the circuitry supporting substrate 130 at a lower side of the through holes 131. Each light emitting unit is at least partially located in a corresponding through hole 131.

The light emitting unit 140 may be an LED or other light emitting units that consumes less power and are capable of implement a multi-color light. The light emitting unit may emit light that may be changed in strength and color according to a control signal and pass through the through holes 131 to illuminate the corresponding key buttons 121.

A diffusion sheet or diffusion member 125 may be installed between the key buttons 121 and the circuitry supporting substrate 130 in order to diffuse light emitting from the light emitting unit 140 to the key buttons 121. The diffusion sheet 125 may be made by adding a diffuser to a light-transmissive base sheet or applying corrosion or scratches on one surface or both surfaces of the light-transmissive base sheet, whereby light emitting from the light emitting unit 140 can uniformly spread to the key buttons 121 to thus prevent light partiality and to accomplish a smooth illumination effect. In addition, the diffusion sheet 125 can be a light guide plate.

Shielding members 110 are provided between key buttons 121 in order to prevent light emitting from the light emitting units from being leaked to adjacent key buttons. The shielding members 110 may be formed in the shape of a wall to provide shielding between the key buttons, and can be formed to also have a function of preventing the key buttons 121 from being separated from the mobile terminal as shown. The shielding members 110 can be formed as part of the case itself that supports the key buttons 121 or can be implemented by rubber or silicon rubber that connects the key buttons 121. If not made of rubber or silicon rubber, the shielding members 110 can be formed by molding an opaque resin or a metal, and it may have a reflective surface formed on its inner wall.

The key buttons 121 can have transmissive regions or can be made of transmissive material that ranges from substantially opaque to fully transparent. A mark 126 indicating content for inputting or instructing of each key 120 may be printed on a lower surface of the key buttons 121. Accordingly, by positioning the mark 126 at a position distanced from upper surfaces of the key buttons, light emitting to the exterior from the key buttons 121 cannot be covered by the mark 126 itself to thus prevent an uneven distribution of light. Alternatively, the mark 126 can be formed in a stacking manner within the key buttons 121 or can be printed on the upper surfaces of the key buttons 121.

With the foregoing structure, the key buttons 121 can be manipulated for inputting in a touching manner and can be illuminated upon receiving light emitting from the lower light emitting units 140. The key buttons 121 can be illuminated differently according to their positions or time and also can be illuminated in different colors to effectively create illumination.

The individual illumination of the keys 120 may implement diverse user interface environments by accomplishing the illumination effects when the mobile terminal 1 is turned on or off, or by serving as a guidance for pressing a next key for a message corresponding to a menu selection (in this case, a corresponding key button to be selected next can be blinking for user's easy recognition).

Figure 5:
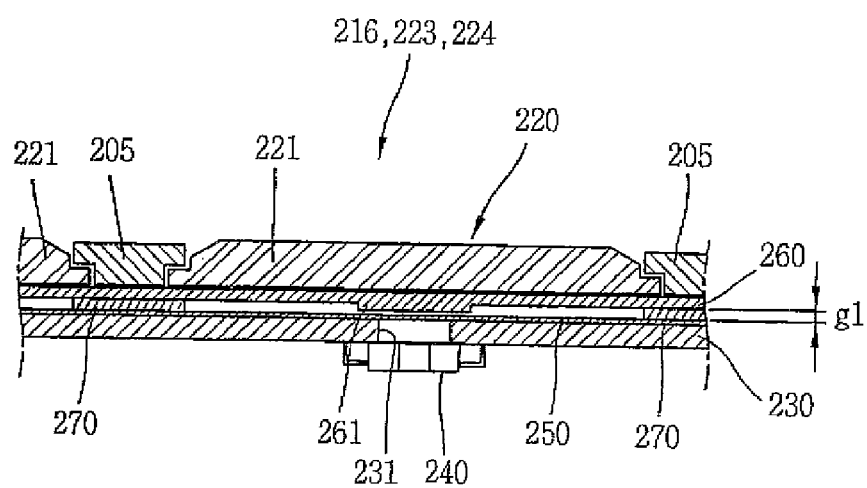
FIG. 5 is a sectional view showing another example of a manipulation part according to the exemplary embodiment of the present invention.

FIG. 5 is a sectional view showing another example of the manipulation part according to the exemplary embodiment of the present invention. Manipulation units 216, 223, and 224, as shown in FIG. 5, are applied for touch type keys that generate input signals upon sensing pressure of a user's finger.

A circuitry supporting substrate 230 that supports key buttons 221 is located at a lower side of the key buttons 221. A touch sensing part 250 that senses pressure of the user's finger or stylus pen contacting with the key buttons 221 is provided between the circuitry supporting substrate 230 and the key buttons 221.

A pad 260 having a protrusion 261 for pressing the lower touch sensing part 250 is provided on a lower surface of the key buttons 221. A certain gap (g1) is formed between the pad 260 and the touch sensing part 250 at a lower side of the pad 260 in order to allow contacts to move into and out of contact with each other according to movement or deformation of the key buttons 221 according to a change in pressure.

The touch sensing part 250 may be made of a transmissive material, and light emitted from the light emitting unit 240 installed on a lower surface of the circuitry supporting substrate 230 passes through a through hole 231 and the touch sensing part 250 to proceed to the key button 221.

A first shielding member 205 is formed between key buttons 221. The first shielding member 205 can be implemented by a case supporting the key button 221, and also can be implemented opaque rubber or silicon rubber connecting the key buttons 221.

A second shielding member 270 to prevent light leakage is provided between the pad 260 and the touch sensing part 250, while maintaining the gap g1. The second shielding member 270 can be formed as a band shape for dividing the key buttons 221 and may be formed as a double-sided tape. In addition, the second shielding member 270 may be formed integrally with the pad 260.

With the foregoing structure, when the user's finger comes in contact with the key button 221, the lower surface of the key button 221 is minutely deformed to cause upper and lower terminals (not shown) of the touch sensing part 250 to contact with each other, and the touch sensing part 250 converts it into an input signal and transmits it. Light emitting from the light emitting unit 240 illuminates the corresponding key button 221 without being leaked to an adjacent key button 221, to thus create an individual illumination effect.

Figure 6A:
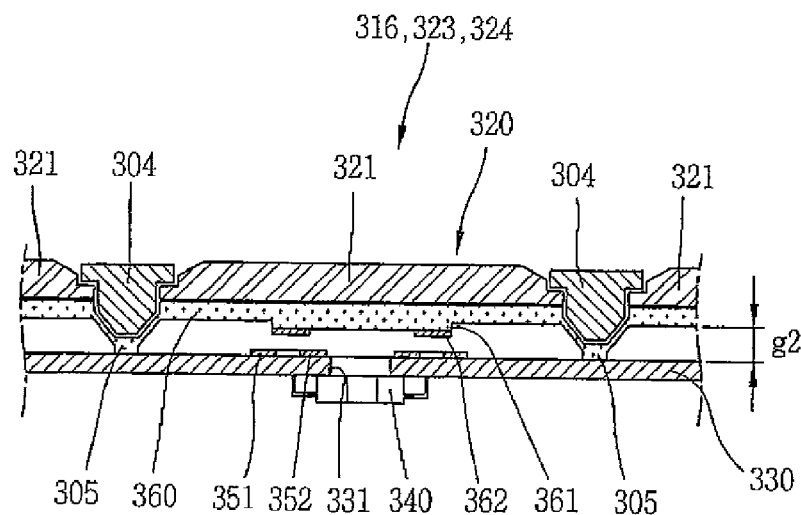
FIGS. 6A and 6B are sectional views showing still another example of a manipulation part according to the exemplary embodiment of the present invention.
Figure 6B:
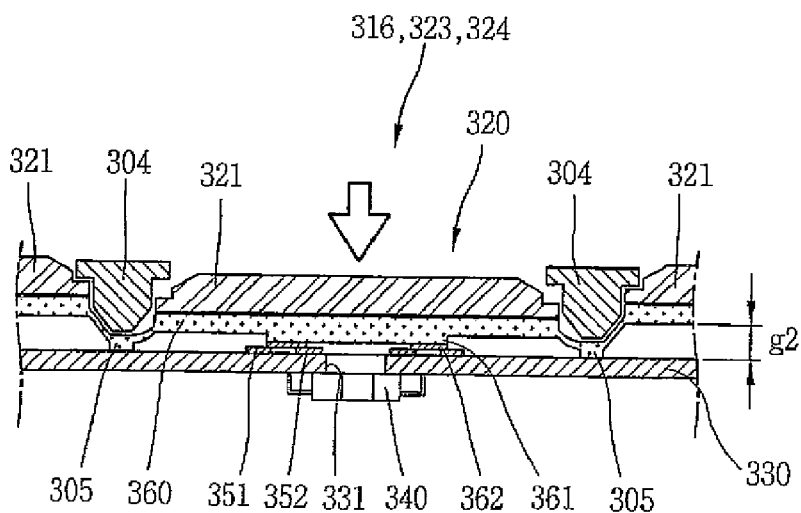

FIGS. 6A and 6B are sectional views showing still another example of a manipulation part according to the exemplary embodiment of the present invention. In this configuration, the manipulation units 16, 23 and 24 are applied to a push type key 320 that inputs by clicking whenever being pressed by the user's finger.

Each key 320 includes a key button 321 that can be pressed and electrical contacts 351 and 352 that are positioned below the key button 321. The electrical contacts are configured to generate an input signal when the key buttons 321 are pressed and contact is made with the electrical contacts 351 and 352.

The electrical contacts 351 and 352 are formed as concentric circles on a circuitry supporting substrate 330, each having a different radius. A through hole 331 is formed at the central portion of the terminals 351 and 352 and allows light emitting from the light emitting unit 340 mounted at a lower side of the circuitry supporting substrate 330 to proceed upwardly.

An elastic film 360 is attached on the lower surface of the key button 321 and elastically supports the key button 321 such that the key button 321 can be returned after being elastically pressed. The key button 321 and the elastic film 360 are made of a transmissive material so that light emitting from the light emitting unit 340 therein can proceed in an upward direction.

A conductive membrane 362 formed in a circular band type is formed on a lower surface of the elastic film 360 and connects the electrical contacts 351 and 352 when the key button 321 is pressed towards the circuitry supporting substrate. The conductive membrane 362 can be formed at a pressing protrusion 361 protruded from the elastic film 360.

A first shielding member 304 is positioned between the key buttons 321 and prevents light from the light emitting unit 340 from being leaked to adjacent key buttons 321. The first shielding member 304 may be formed as part of the case supporting the key buttons 321.

A second shielding member 305 is formed as an elastic film at an edge of each key button 321 in order to prevent light leakage between the key buttons 321, to maintain a certain gap g2 between the key buttons 321 and the circuitry supporting substrate 330, and to elastically return a pressed key button 321 to a non-pressed state.

With the foregoing structure, when one key button 321 is pressed, as shown in FIG. 6B, the conductive membrane 362 on the lower surface of the key button 321 comes down to electrically connect the electrical contacts 351 and 352 to transmit a corresponding input signal. When the input signal is received, light from the light emitting unit 340 provided on the lower surface of the circuitry supporting substrate 330 passes through the through hole 331 to individually illuminate the key button 321.

As so far described, the mobile terminal according to the present invention has the following advantages.

According to the mobile terminal according to the present invention, a more convenient user interface can be provided because the keys can have individual illumination effects.

Also, according to another aspect of the present invention, because the light emitted from the light emitting units (that illuminate the keys) do not leak to adjacent keys due to the shielding members, the keys can be independently illuminated and thus key illumination can be individually controlled.

If desired, more than one light emitting unit may be illuminated to provide various illumination effects, such as indicating which key buttons can be used with the current operation mode of the mobile terminal.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a terminal body; and
    a keypad located on the terminal body, the keypad including:
      a circuitry supporting substrate having a plurality of through holes;
      a plurality of keys, each of the keys configured to cover a first opening of a corresponding through hole;
      a touch sensing part disposed at an upper portion of the circuitry supporting substrate;
      a plurality of light emitting units having at least one lighting unit disposed at a lower portion of the circuitry supporting substrate and configured to cover a second opening of a corresponding through hole, each light emitting unit being associated with a corresponding key of the plurality of keys to separately illuminate the corresponding key;
      a shielding member configured to prevent leakage of light from an activated light emitting unit to adjacent keys; and
      a control unit configured to detect when one of the plurality of keys is operated and to activate at least the light emitting unit associated with the operated key,
      wherein the shielding member is arranged to divide the plurality of keys, and the shielding member is configured to cover at least an upper portion of the plurality of keys, and
      wherein the first opening of the through hole for passing light therethrough is formed toward a central region of the corresponding key.

2. The terminal of claim 1 wherein the lighting unit is configured to cause the light emitting unit associated with the operated key to blink.

3. The terminal of claim 2, wherein the lighting unit is configured to cause at least one additional light emitting unit to blink when the one of the plurality of keys is operated.

4. The terminal of claim 2, wherein the lighting unit controls the light emitting unit associated with the operated key by one of a spatial position, illumination time, light strength, color of each light emitting unit, and combinations thereof.

5. The terminal of claim 2, wherein the lighting unit illuminates a corresponding light emitting unit or a light emitting unit selected from the remaining light emitting units according to a key input.

6. The terminal of claim 1, wherein the shielding member is an opaque wall.

7. The terminal of claim 6, wherein the plurality of keys have a plurality of key buttons, each of the key buttons having a transmissive region,
    wherein the touch sensing part is configured to sense a touch applied to one of the plurality of key buttons.

8. The terminal of claim 7, wherein the touch sensing part is configured to sense one of a change in capacitance and pressure.

9. The terminal of claim 7, wherein a diffusion member is provided between each of the key buttons and the circuitry supporting substrate and configured to diffuse light emitting from the light emitting unit to the transmissive region of the key buttons.

10. The terminal of claim 7, wherein the circuitry supporting substrate includes a through hole corresponding to each of the plurality of light emitting units, each through hole receiving at least a portion of the corresponding light emitting unit therein.

11. The terminal of claim 1, wherein each light emitting unit is an LED.

12. The terminal of claim 1, wherein each of the plurality of keys is operated in a touch manner to input information.

13. The terminal of claim 12, wherein the plurality of keys includes:
    a plurality of key buttons;
    a pad positioned at lower portions of key buttons; and
    a touch sensing part disposed at lower portions of the key buttons, the touch sensing part being configured to sense a touch applied to one of the plurality of key buttons.

14. The terminal of claim 13, wherein the pad is integrally formed to fix the key buttons.

15. The terminal of claim 14, wherein the shielding member includes:
    a first shielding member positioned at an upper portion of the pad to prevent light leakage between key buttons; and
    a second shielding member positioned between the pad and the touch sensing unit to prevent light leakage between the light emitting units.

16. The terminal of claim 1, wherein each of the plurality of keys is operated in a push manner to input information.

17. The terminal of claim 16, wherein each key includes:
    a key button having an edge;
    an elastic film formed on the edge of the key button; and
    a switch positioned at a lower portion of the key button, the switch being operated by the key button.

18. The terminal of claim 17, wherein the shielding member is located at the elastic film.

19. The terminal of claim 17, further comprising a circuitry supporting substrate, each of the switches being located on the circuitry supporting substrate,
    wherein each switch includes:
    a plurality of electrical contacts formed in a concentric circle on the circuitry supporting substrate; and
    a conductive membrane formed on a lower surface of the elastic film, the conductive membrane being configured to contact the electrical contacts when the key button is pressed.

20. The terminal of claim 15, wherein the terminal body includes a casing defining the exterior of the terminal,
    wherein the first shielding member is integrally formed as part of the casing.

21. The terminal of claim 20, wherein the first shielding member formed as part of the casing overlaps the second shielding member.

* * * * *